Jan. 18, 1966 T. B. HOOKER 3,230,378
LARGE FIELD OF VIEW ORIENTATION SENSOR
Filed May 23, 1962 4 Sheets-Sheet 1
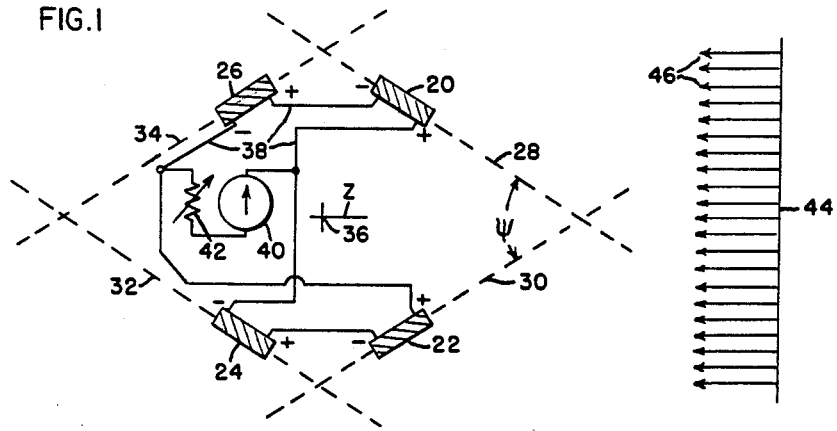
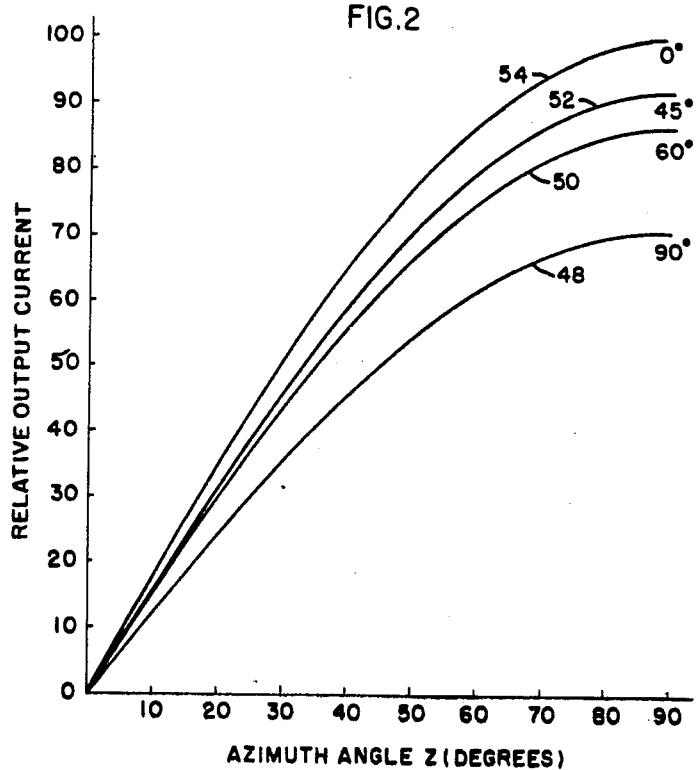
INVENTOR:
THOMAS B. HOOKER,
BY
HIS ATTORNEY.

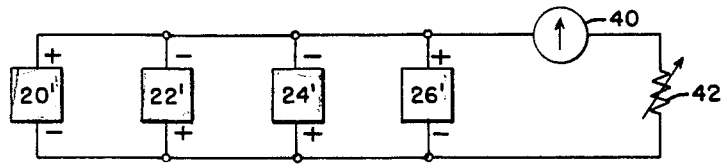
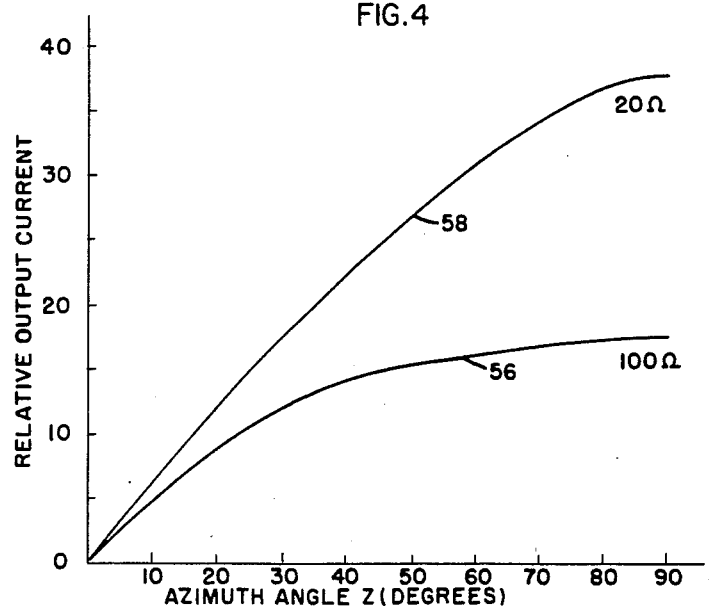
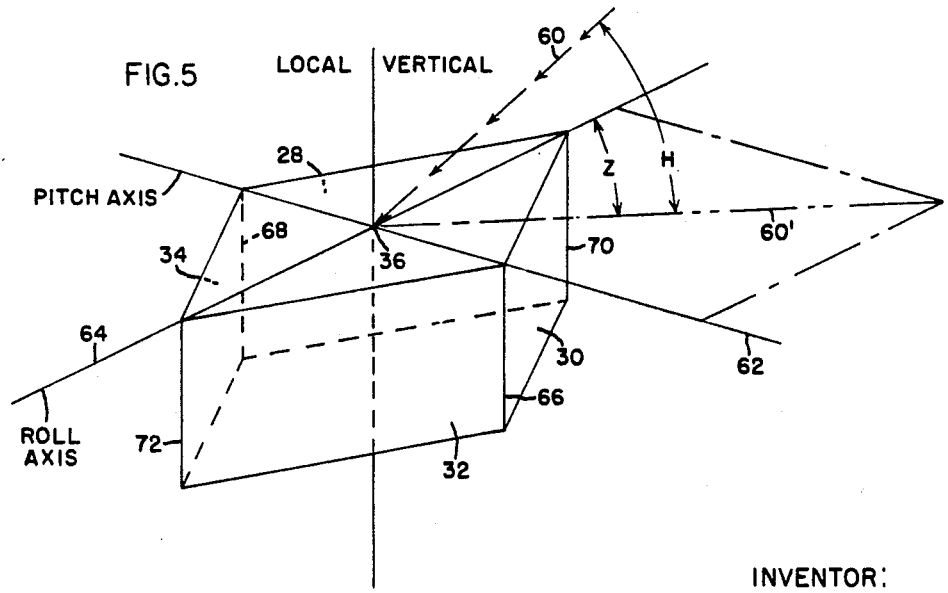

FIG.6
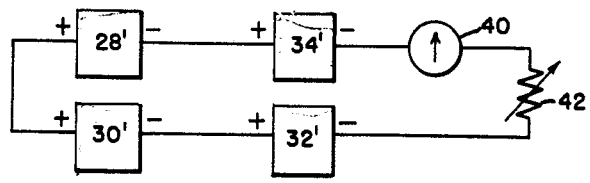
FIG.7
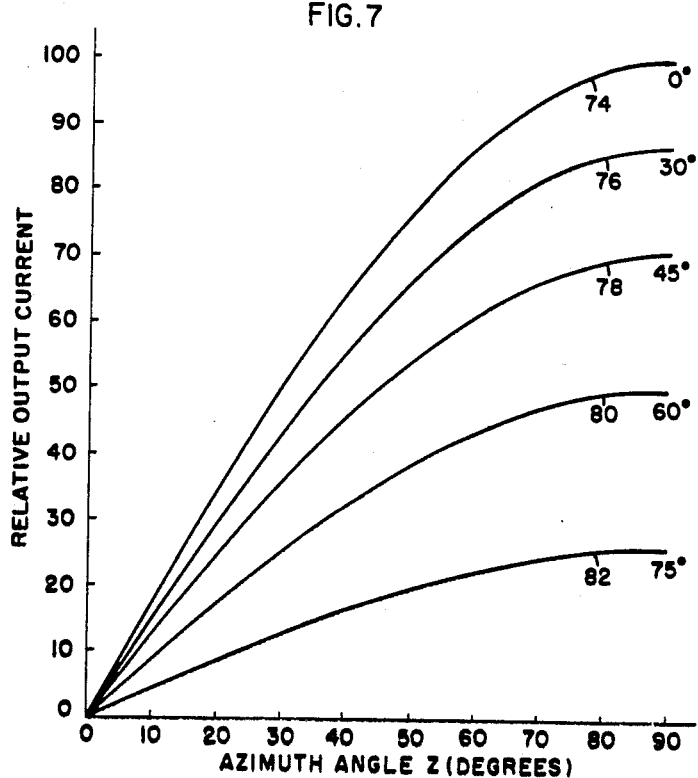
INVENTOR:
THOMAS B. HOOKER,
BY 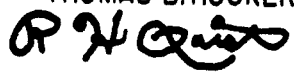
HIS ATTORNEY.

Jan. 18, 1966 T. B. HOOKER 3,230,378
LARGE FIELD OF VIEW ORIENTATION SENSOR
Filed May 23, 1962 4 Sheets-Sheet 4
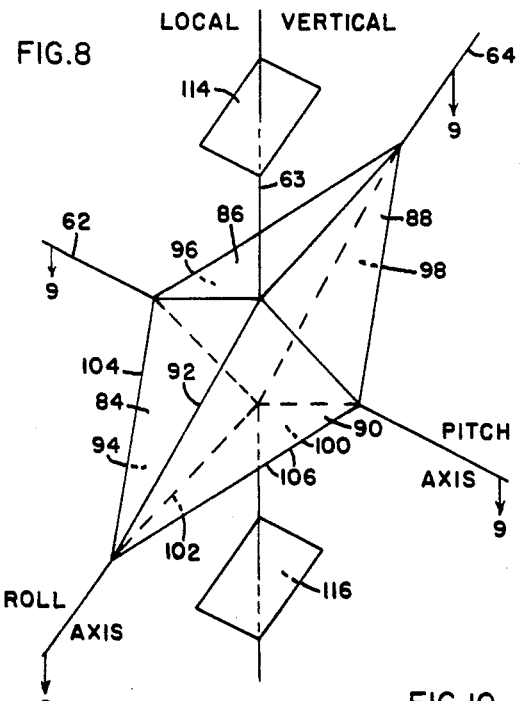
FIG. 8
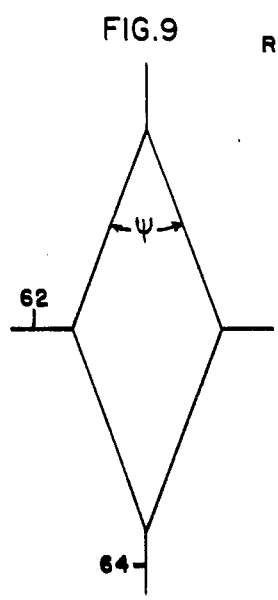
FIG. 9
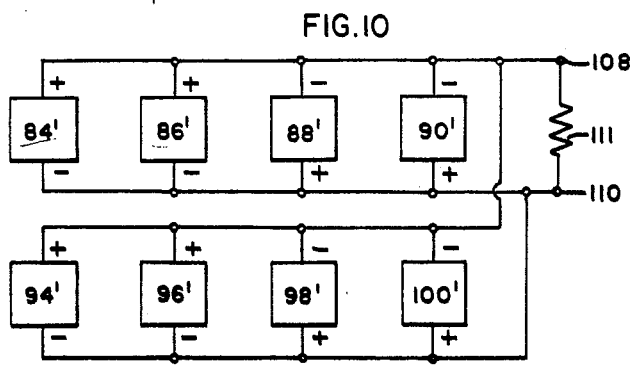
FIG. 10
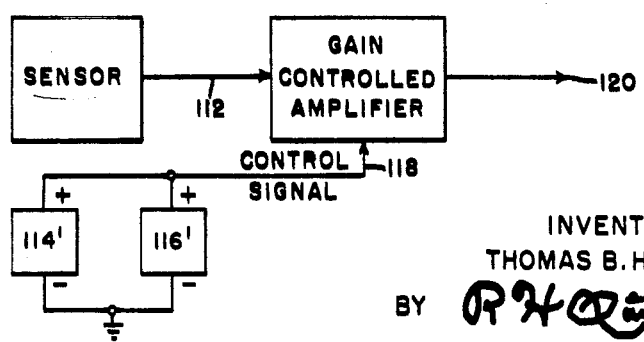
FIG. 11
INVENTOR:
THOMAS B. HOOKER;
BY 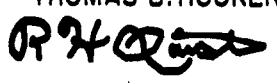
HIS ATTORNEY.

3,230,378
LARGE FIELD OF VIEW ORIENTATION SENSOR
Thomas B. Hooker, Drexel Hill, Pa., assignor to General Electric Company, a corporation of New York
Filed May 23, 1962, Ser. No. 197,204
10 Claims. (Cl. 250—220)

This invention relates to a sensor for indicating the relative location of an energy source from a body upon which the sensor is mounted. The energy source may be the sun, which serves as a source of solar energy, and the body upon which the sensor is mounted may be an earth-orbiting vehicle.

An object of this invention is to provide a sensor having a wide field of view and which has an output response which is nearly proportional to the angular deviation between the sensor's line-of-sight and an energy source over a wide range of angular deviations.

A further object of this invention is to provide a sensor having a wide field of view, a linear response, and requiring no local power supply, but which will continue to be self-energizing for a long period such as a two-year operating period.

A feature of the invention is to provide a sensor which is divided into a large number of cells individually mounted about an earth-orbiting vehicle to ensure a spherical field of view with at least two cells illuminated at all times and without requiring preferred positioning essential to other instrumentation of the vehicle.

In the design of an energy source position sensor having a large field of view, such as is required in a sun sensor for an earth-orbiting vehicle, it is frequently necessary that the sensor unit may not occupy a unique position, which may be most suitable for its operation, but must be displaced from such a preferred position by higher priority instrumentation. An example of such a preferred position would be on the axis which is adjusted to maintain a particular orientation with respect to the energy source. Other problems which are encountered when the sensor is to be used as a sun sensor on an earth-orbiting vehicle, in addition to the requirements that the design be simple, rugged, reliable, and of light weight, are that the sensor consume very little energy from the local power source or preferably receive all of its operating energy from the energy source to which it is responsive in order to obtain longevity of operation. Therefore, it is a primary feature of my invention to provide a sensor having a number of individual cells which need only be mounted on the vehicle with a predetermined orientation relative to a local coordinate system and which need occupy no specific preferred position on the vehicle. Furthermore, I provide a number of photoemissive solar cells, whereby the sensor is simple, rugged, reliable, and of light weight and, in addition to this, derives its energy from the source to which it is responsive rather than requiring a local power supply. My invention is particularly directed toward the placement of the individual solar cell elements, which comprise the sensor, such that a connection of the elements in a null-balance arrangement will have a high linearity of output responsive to deviations about the region of null-balance, and illumination of at least some of the cells occurs under the most severe operating conditions to minimize secondary effects, such as stray pickup.

In the present invention, the features of my invention which are believed to be novel are set forth with particularity in the appended claims. My invention itself, however, both as to its organization and method of operation, together with further objects and advantages, may best be understood by reference to the following description taken in connection with the accompanying drawings in which:

FIGURE 1 is a schematic representation of one embodiment of my invention showing the relative position of sensor cells;

FIGURE 2 indicates the relative response of the sensor of FIGURE 1 for various geometrical arrangements of the sensor cells as a function of sensor position relative to an energy source;

FIGURE 3 is a schematic circuit showing an alternative parallel cell connection analogous to the bridge connection of FIGURE 1;

FIGURE 4 shows the relative response of the sensor of FIGURE 1 for two conditions of sensor load as a function of sensor position relative to an energy source;

FIGURE 5 shows a three-dimensional representation of one embodiment of my invention;

FIGURE 6 shows an electrical connection of sensor elements as arranged in FIGURE 5;

FIGURE 7 graphically represents the relative sensor output for various angles of energy source elevation and deviation;

FIGURE 8 indicates another three-dimensional embodiment of my invention;

FIGURE 9 shows a cross-section on plane 9—9 of FIGURE 8;

FIGURE 10 indicates an electrical connection of sensor elements arranged in accordance with FIGURE 8; and FIGURE 11 shows a schematic diagram indicating compensating cells which may be used with the sensor of my invention.

Referring to FIGURE 1 of the drawing, my invention may employ an arrangement of four modules or cells 20, 22, 24 and 26 on each of four planes 28, 30, 32 and 34, respectively. The planar responsive surfaces of the cells 20–26 are mounted parallel to the planes 28–34, and the cells may be any detectors which have a response varying approximately as the sine of the angle of energy ray incidence such as, for example, silicon solar cells. The term cell, as used herein, is also meant to encompass a plurality of individual units with coplanar responsive surfaces mounted as an integral assembly and electrically connected in series or parallel relationship. The cross-section of the figure defined by planes 28–34 is rhombus-shaped with an included dihedral angle $\psi$ which is considered as a variable. Passing through the geometrical center 36 of the figure is a zero azimuth angle (Z) line which bisects the variable angle $\psi$. An electrical loop network is shown wherein conductors 38 serially connect the cells, and current indicator 40 and variable resistance load 42 are provided in a bridge circuit.

An energy source 44 is diagrammatically shown directing parallel rays 46 toward the sensor. The assumption of parallel rays, in the case of an energy source comprising the sun, is valid since the sun may be considered as a one-half degree source emanating rays of light from a distance of 93,000,000 miles and, hence, the angle between any two adjacent rays will be infinitesimal. In the orientation shown, wherein the azimuth angle is zero, it may be seen that an equal amount of illumination will occur on the active surfaces of cells 20 and 22 and no illumination will fall upon cells 24 and 26. Since cells 20 and 26 are shown serially disposed in additive relationship of one polarity and cells 22 and 24 are connected in additive relationship of the other polarity, the response of cell 20 will be cancelled by the response of cell 22 when each is subjected to equal illumination. It may be seen by applying simple geometric principles that no illumination will fall on cell 24 until rotation about center 36 is sufficient to produce an azimuth angle Z equal to $\psi/2$ at which time cell 20 ceases to be responsive to the source. It may be seen that for intermediate positive values of azimuth angle Z, cell 22 will receive an increased illumination and cell 20 will receive a decreased illumination such that balance is disturbed and current will flow through meter 40 in response to the proportion by which cell 22 overpowers cell 20. As the azimuth angle begins to change in the direction, a reverse result will occur and cell 20 will receive more illumination than cell 22 resulting in a reverse current flow through meter 40 which is indicative of the extent of azimuth angle Z deviation.

Turning to FIGURE 2, the graph therein represents the relative current output as measured by meter 40 for deviations in azimuth angle Z. The curves 48, 50, 52 and 54 represent the relationship between the aforementioned parameters for fixed angles of ψ equal to 90°, 60°, 45°, and 0°, respectively. The graph shows only the first quadrant wherein the values of azimuth angle Z and relative output current are positive; however, a corresponding relationship exists in the third quadrant for negative values of azimuth angle Z and negative output response. From inspection of curve 54 of FIGURE 2, it is apparent that a value of ψ equal to zero provides the most rapid response, or largest slope, about the null-balance region where azimuth angle Z is equal to zero. This indicates that, for a maximum rate of response about the null-balance region, cells 20 and 26 should lie in a common plane parallel to source rays 46, and cells 22 and 24 should likewise lie in a common plane parallel to rays 46 when the azimuth angle is zero. However, it is readily apparent that such a configuration of cells will admit of no illumination and, consequently, no cell response at the zero azimuth angle position. An azimuth angle of zero is frequently the desired position to which a system responsive to sensor output attempts to orient a space vehicle. As a practical matter, it is undesirable to have zero illumination of the cells during their normal condition since this leaves the sensor susceptible to stray electrical radiations from internal sources and increases sensitivity to other external sources to which the sensor is not designed to be responsive. Therefore, in order to provide cell illumination in the null-balance, or zero azimuth orientation, and yet to provide minimum degradation of the response indicated by curve 54, the angle ψ will usually more advantageously be selected approximately equal to 45° giving a response as shown in curve 52 of FIGURE 2. It may be seen that such a selection provides nearly the high slope of curve 54, particularly in that area of small azimuth angle deviation which is frequently the normal range of operation.

FIGURE 3 shows an alternative connection of cells from that of FIGURE 1. The cells 20', 22', 24' and 26' correspond to cells 20, 22, 24 and 26 respectively, and the alternative electrical connection represents a parallel circuit arrangement having response characteristics analogous to the series circuit arrangement of FIGURE 1, as shown in FIGURE 2. Indicator 40 and variable resistor 42 of FIGURE 3 correspond to indicator 40 and the variable resistor 42 of FIGURE 1.

FIGURE 4 shows the actual response of a sensor physically arranged as shown in FIGURE 1, and electrically connected as shown in FIGURE 3. Curves 56 and 58 indicate the relative output current for various azimuth angle Z deviations when load resistance 42 is 100 and 20 ohms, respectively. The curves of FIGURE 4 clearly indicate that a more desirable response, having greater linearity and a sharper slope upward, will attend a decrease in value of load resistor 42. FIGURE 4 represents actual test data derived from the use of International Rectifier Corporation cells type SM5–1020B (embedded in an epoxy resin) disposed as in FIGURE 1 with ψ equal to 45° and an electrical connection as shown in FIGURE 3. The relative output current is measured in milliamps and the light source is a 150 watt projection lamp located approximately at the focal point of a ten inch diameter collecting lens.

FIGURE 5 is a three-dimensional representation of the sensor shown in FIGURE 1 having the mutually parallel planes 28, 30, 32 and 34 shown in FIGURE 1. One ray 60 of a source of parallel rays is shown impinging at the intersection of the pitch axis 62 and the roll axis 64. A trace 60' of ray 60 is shown appearing on the horizontal plane defined by the pitch axis and roll axis. The azimuth angle Z of the ray is indicated between trace 60' and roll axis 64, while the elevation angle H of ray 60 is indicated between ray 60 and trace 60'.

The pitch axis 62 is one line in a vertical plane bisecting the dihedral angle 66 formed by intersecting planes 30 and 32 and also bisecting the dihedral angle 68 formed by intersecting planes 28 and 34. In a similar manner, roll axis 64 is one line in a vertical plane which bisects dihedral angle 70 formed by intersecting planes 28 and 30 and dihedral angle 72 formed by intersecting planes 32 and 34. The planes 28–34, therefore, comprise a cylinder (i.e., the surface traced by any straight line moving parallel to a fixed straight line, here the local vertical axis). As previously disclosed relative to FIGURE 2, dihedral angles 70 and 72 may be selected to be 45°, and, because of the symmetrical arrangement of the rhombus, dihedral angles 66 and 68 would then each be 135°.

FIGURE 6 shows an electrical connection of cells 28', 34', 30' and 32', which are disposed such that their planar surfaces are parallel to, although not necessarily lying within, the plane surfaces 28, 34, 30 and 32, respectively. With a series electrical connection of cells similar to that shown in FIGURE 1, the sensor will have a response characteristic similar to curve 52 of FIGURE 2 for deviations of azimuth angle wherein the energy source is confined to the plane defined by roll axis 64 and pitch axis 62 (i.e., for elevation angles H equal to zero).

FIGURE 7 shows graphically how the sensor response is affected by changes in elevation angle H. Curves 74, 76, 78, 80 and 82 represent sensor response for elevation angles of 0°, 30°, 45°, 60°, and 75°, respectively. It may be seen from inspection that the magnitude of response diminishes with increasing elevation angles H, and it appears that the sensor response falls to zero for all azimuth angles when the elevation angle H reaches 90° (i.e., the source is on the local vertical axis). With the source on the local vertical axis, the parallel rays emanating therefrom will at all times be parallel to the surface of all sensor cells and, therefore, will produce no illumination of the cells. It will be readily appreciated that, if the sensor is to operate in environments wherein large elevation angles may be encountered, a low illumination of the cells will result and the difficulties with stray pick-up which were mentioned with regard to the arrangement of FIGURE 1 when the angle ψ is equal to zero will likewise obtain here.

The embodiment of my invention which is shown in FIGURE 8 is particularly well adapted to applications wherein high elevation angles may be encountered. The sensor of FIGURE 8 achieves a spherical field of view wherein any relative position of the energy source will provide illumination of suitable strength on at least two cells, though the sensor response may be zero because of the cancelled output of the two cells. In FIGURE 8, there are shown four planes 84, 86, 88 and 90 intersecting the plane defined by roll axis 64 and pitch axis 62 such as to form a rhombus as shown in FIGURE 9. The four planes intersect at a point disposed on the local vertical axis and define four dihedral angles such as angle 92. Similarly, planes 94, 96, 98 and 100 are disposed beneath the plane defined by roll axis 64 and pitch axis 62 and intersect therewith to describe a rhombus coincident with that described by the upper four planes 84–90. The four lower planes 94–100 meet at a point on the local vertical axis below the plane defined by roll axis 64 and pitch axis 62 and four dihedral angles are formed, such as 102. Angle 92 and the similarly disposed opposite angle 102 may be selected equal to a value of 45° in a preferred embodiment, as previously discussed, in order to achieve a response characteristic analogous to curve 52 of FIGURE 2 when the energy source lies within the plane defined by roll axis 64 and pitch axis 62 (i.e., for zero elevation). Dihedral angle 104 formed by planes 84 and 94 may likewise be determined by reference to the graph of FIGURE 2 by substituting elevation angle H for azimuth angle Z. The graph will then represent changes in sensor response as a function of elevation angle H for a source included in the plane defined by local vertical axis 63 and roll axis 64. Inasmuch as the sensor will not be usually utilized where it is desirable to maximize response to changes in elevation angle H, a curve, such as 48 of FIGURE 2, may be selected and the angles 104 and 106 made equal to 90°. Where, as in the illustrated embodiment, angles 92 and 102 are selected as 45°, angles 104 and 106 will be somewhat larger than 135°. Such large angles tend to minimize sensor response to elevation changes and yet maintain a spherical field of view.

FIGURE 10 shows a parallel electrical connection of cells disposed parallel to, but not necessarily included in, planes 84–90, 94–100 of FIGURE 8. The respective cells are denominated 84′–90′, 94′–100′ and are connected to output terminals 108 and 110 which serve resistance load 111. A series arrangement of components analogous to the electrical connections shown in FIGURE 1 and FIGURE 6 may likewise be employed if desired, and particularly where a larger output voltage is required from a given number of cells.

FIGURE 11 shows an electrical circuit arrangement for producing an output signal which varies only with changes in the azimuth angle and which is independent of changes in the elevation angle H. A sensor, of the type shown by FIGURE 8 for example, having elements parallel to planes 84–90, 94–100 and electrically connected as shown in FIGURE 10, has an output 112, such as taken from terminals 108 and 110 of FIGURE 10 which supplies the input signal to a gain controllable amplifier (such as, for example, a magnetic amplifier having two control windings) having an amplification factor or gain which increases in response to an increase in the output signal of cells 114′ and 116′ which lie parallel to planes 114 and 116 as shown in FIGURE 8. The planes 114 and 116 are perpendicularly disposed with respect to the local vertical axis and the output signal from cells 114′ and 116′ increases sinusoidally with increases in elevation angle to produce an automatic gain control signal 118 to the amplifier, thus providing a controlled output 120. As the sensor output 112 decreases for increasing elevation angles, and the amplifier gain is caused to increase by the increased illumination falling on either cell 114′ or 116′ causing control signal 118 to become larger, the resultant amplifier output 120 may be either partially or totally compensated for changes in elevation angle. It is apparent that a sensor arranged in accordance with FIGURE 5 would also suffice in the circuit of FIGURE 11, by placing cells 114′ and 116′ of FIGURE 11 parallel to local vertical axis 63 of FIGURE 5.

While I have shown specific embodiments of my invention, it will, of course, be understood that I do not wish to be limited thereto since various arrangements and modifications of the structure of my invention may be made, and I intend by the appended claims to cover any such structures and modifications as fall within the true spirit and scope of my invention.

What is claimed as new and desired to be secured by Letters Patent of the United States is:

1. A sensor having a wide field of view for generating a voltage indicative of the location of an energy secure relative to the sensor, comprising:
    a plurality of energy sensitive electrical signal generating cells,
    each of said cells having a plane surface and providing an electrical signal output which varies in magnitude as the sine of the angle defined between its plane surface and a line drawn from its plane surface to a distant energy source to which it is responsive,
    said plane surface of each of said cells being exposed to radiation from any point on an imaginary hemisphere having its base coincident with said plane surface and its center coincident with said cell,
    said cells being so positioned that their plane surfaces define planes forming at least two oppositely disposed acute dihedral angles, and
    conductive means connecting said electrical signal generating cells to provide an electrical output having a magnitude and polarity dependent upon the relative location of the distant source of energy and varying more rapidly therewith when said distant source of energy is near the vertical plane bisecting said acute angles.

2. The sensor of claim 1 wherein said conductive means connect said cells in parallel circuit relationship.

3. The sensor of claim 1 wherein said conductive means connect said cells in null-balance bridge relationship.

4. The sensor of claim 1 wherein said acute dihedral angles are approximately equal to 45 degrees.

5. A sensor having a wide field of view for generating a voltage indicative of the location of an energy source relative to the sensor, commprising:
    a plurality of energy sensitive electrical signal generating cells,
    each of said cells having a plane surface and providing an electric signal output which varies in magnitude as the sine of the angle defined between its plane surface and a line drawn from its plane surface to a distant energy source to which it is responsive,
    said cells being so positioned that their plane surfaces define planes forming at least two oppositely disposed acute dihedral angles,
    first conductive means connecting said electrical signal generating cells to provide an electrical output having a magnitude and polarity dependent upon the relative location of the distant source of energy and varying more rapidly therewith when said distant source of energy is near the vertical plane bisecting said acute angles,
    a gain controlled amplifier having an input terminal, an output terminal and a gain control input terminal,
    said amplifier providing an increased gain in signal magnitude between said input terminal and said output terminal in response to an increase in signal level at said gain control input terminal,
    second conductive means connecting the electrical output of said electrical signal generating cells to the input terminal of said gain controlled amplifier,
    additional energy sensitive electrical signal generating cells positioned perpendicular to said vertical plane bisecting said acute angles to provide an auxiliary electrical output varying inversely with said electrical output in response to deviations of said energy source in a plane perpendicular to said vertical plane bisecting said acute angles, and
    third conductive means connecting said auxiliary output to the gain control input terminal of said gain controlled amplifier, to provide a sensor response at the output terminal of said gain controlled amplifier which is substantially independent of deviations of said energy source in said plane perpendicular to said vertical plane bisecting said acute angles.

6. The sensor of claim 5 wherein said acute dihedral angles are substantially 45 degrees.

7. A sun sensor having a spherical field of view for generating a voltage indicative of the location of the sun relative to the sensor, comprising:
    a plurality of solar-energy sensitive electrical signal generating cells, each of said cells having a plane surface and providing an electric signal output which varies in magnitude as the cosine of the angle of incidence of sun rays upon said plane surface, said cells being so positioned that their plane surfaces define planes forming a polyhedron with at least two pairs of oppositely disposed acute dihedral angles, and conductive means connecting said electrical signal generating cells to provide an electrical output having a magnitude and polarity dependent upon the relative location of the sun and varying more rapidly therewith when said distant source of energy is near the vertical plane bisecting said acute angles.

8. The sensor of claim 7 wherein said acute dihedral angles are substantially 45 degrees.

9. A sun sensor having a spherical field of view for generating a voltage indicative of the location of the sun relative to the sensor, comprising:

a plurality of solar-energy sensitive electrical signal generating cells, each of said cells having a plane surface and providing an electric signal output which varies in magnitude as the sine of the angle defined between its plane surface and a line drawn from its plane surface to the sun, said cells so positioned that their plane surfaces define planes forming a polyhedron with at least two pairs of oppositely disposed acute dihedral angles, first conductive means connecting said electrical signal generating cells in circuit relationship of varying polarity to provide an electrical output having a magnitude and polarity dependent upon the relative location of the sun and varying more rapidly therewith when the sun is near the vertical plane bisecting said acute angles, a gain controlled amplifier having an input terminal, an output terminal and a gain control input terminal, said amplifier providing an increased gain in signal magnitude between said input terminal and said output terminal in response to an increase in signal level at said gain control input terminal, second conductive means connecting the electrical output of said electrical signal generating cells to the input terminal of said gain controlled amplifier, additional energy sensitive electrical signal generating cells positioned perpendicular to said vertical plane bisecting said acute angles to provide an auxiliary electrical output varying inversely with said electrical output in response to deviations of the sun in a plane perpendicular to said vertical plane bisecting said acute angles, and third conductive means connecting said auxiliary output to the gain control input terminal of said gain controlled amplifier, to provide a sensor response at the output terminal of said gain controlled amplifier which is substantially independent of deviations of the sun in said plane perpendicular to said vertical plane bisecting said acute angles.

10. The sensor of claim 9 wherein said acute dihedral angles are substantially equal to 45 degrees.

References Cited by the Examiner
UNITED STATES PATENTS

| | | | |
|---|---|---|---|
| 2,604,601 | 7/1952 | Menzel | 250—203 X |
| 2,877,284 | 3/1959 | Schultz | 250—203 X |
| 3,050,631 | 8/1962 | Bourguignon | 250—203 |
| 3,059,120 | 10/1962 | Anthony et al. | 250—203 X |

RALPH G. NILSON, *Primary Examiner.*

WALTER STOLWEIN, *Examiner.*

J. D. WALL, *Assistant Examiner.*